Figure 1:
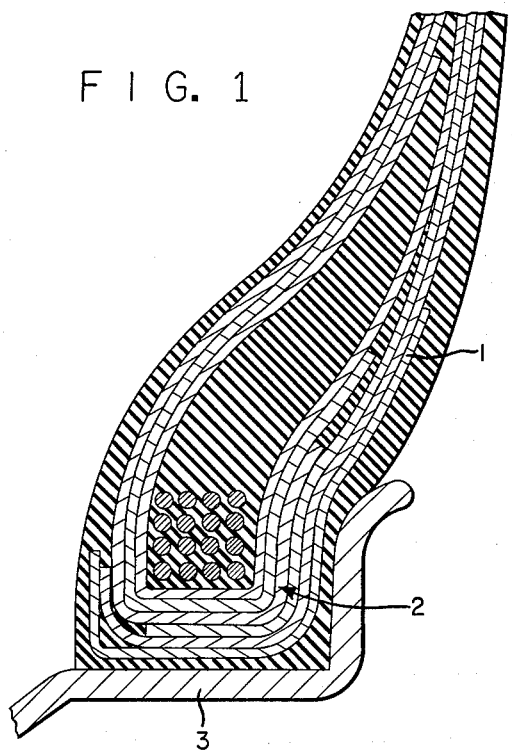

June 7, 1966  J. W. SPARKS ETAL  3,254,694
TIRE CHAFER CONTAINING HEAT FUSED NON-WOVEN
POLYETHYLENE TEREPHTHALATE FIBER
Filed April 17, 1963

INVENTORS
JOHN WILLIAM SPARKS
THOMAS C. DUNN

BY *Sol Schwartz*

ATTORNEY ple purposes, other samples of the non-woven web were treated with typical adhesives prior to calendering on the rubber stock. Adhesive A was a bis-caprolactam capped 2,4-toluene diisocyanate. Adhesive B was a mixture of a butadiene/styrene/vinyl pyridine terpolymers and resorcinol formaldehyde resin.

United States Patent Office 3,254,694
Patented June 7, 1966

3,254,694
TIRE CHAFER CONTAINING HEAT FUSED NON-WOVEN POLYETHYLENE TEREPHTHALATE FIBER
John William Sparks, Wilmington, and Thomas C. Dunn, Hockessin, Del., assignors to E. I. du Pont de Nemours and Company, Wilmington, Del., a corporation of Delaware
Filed Apr. 17, 1963, Ser. No. 273,561
2 Claims. (Cl. 152—362)

This invention relates to pneumatic tires and in particular to an improved construction of the chafer in the bead portion of the tire.

It is known, as shown in Riggs U.S. Patent No. 3,013,599, to utilize chafer fabrics which extend around the bead of the tire to reinforce the bead and to protect it from injury due to abrasion between the tire and that portion of the rim contacted by the tire bead. Especially in the case of tubeless tires, the chafer must also be constructed so as to avoid the leakage of inflationary air into the chafer fabric or the ply fabric where it may cause sidewall blistering or ply separation.

The tire chafer fabrics heretofore used in the manufacture of pneumatic tires, and especially tubeless tires, have been treated with adhesives. This treatment has been required in order to obtain satisfactory adhesion between the chafer fabric and the rubber component of the tire. Another required function of the adhesive with both woven chafer fabrics and the staple non-woven fabrics of the prior art is the filling of the interstices between the individual fibers in order to prevent the inflationary air from passing through the fabric in a direction parallel to the face of the fabric (see the aforementioned Riggs patent). For example, with a woven fabric, the interstices between the individual fibers of the yarn bundles must be thoroughly filled in order to prevent the air from passing along the interior of the yarn bundle.

The impregnation of the chafer fabric is normally accomplished by dipping the fabric in an aqueous dispersion or organic solvent solution of an adhesive or rubbery impregnant which adheres to unvulcanized rubber, and then carefully drying to avoid too rapid removal of the vehicle or carrier. Obviously such a treatment not only entails added cost but also is a time-consuming operation.

This invention provides a chafer fabric for use around the bead portion and outwardly of the reinforcing plies of a pneumatic tire, the chafer being a continuous filament non-woven web structure having the filaments in random non-parallel arrangement and separate and independent of each other except at filament cross-over points, and the web having a layer of rubber calendered on both sides thereof.

FIGURE 1 in the attached drawings is an enlarged sectional view of the bead portion of a tubeless tire mounted on a rim. Chafer fabric 1 protects reinforcing plys 2 in the bead portion of the tire resting against wheel rim 3.

Figure 2:
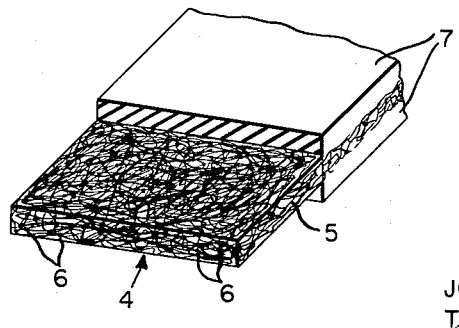

FIGURE 2 is an enlarged perspective view of the chafer strip of the present invention. Bonded web 4 showing continuous filaments 5 and heat-fused copolyester bond points 6 has rubber layers 7 calendered directly on the sides thereof.

A preferred non-woven web for use in this invention is composed of continuous filament polyethylene terephthalate fibers bonded with 5–20% by weight of a copolymer of polyethylene terephthalate and polyethylene isophthalate, based on the non-woven web. Operable non-woven webs have a basis weight of 1–5 oz./yd.$^2$ and are composed of base filaments of 1–6 denier (0.11–0.67 tex). Such webs having a suitable random non-parallel arrangement of the continuous filament fibers can be prepared by the method described in Belgian Patent 608,646 and specifically in Examples 2 and 10 of that patent. The resulting continuous filament non-woven web is rubberized by calendering in a conventional manner with a layer of unvulcanized rubber on both sides. The total thickness of the rubberized web is normally not in excess of 50 mils in order that the web will have sufficent conformability to extend readily around the beads of the tire. The use of spontaneously elongatable fibers, for example, polyethylene terephthalate fibers treated in accordance with U.S. Patent 2,952,879 to have 5–25% spontaneous elongation, also contributes to the conformability of the rubberized non-woven web of this invention.

It is surprising that adequate adhesion is obtained between the continuous filament non-woven webs and the rubber without prior application of an adhesive, particularly when it is well known that one of the biggest barriers to satisfactory use of polyethylene terephthalate tire cord was its poor adhesion to rubber. It is also surprising that conventional calendering of rubber directly onto the continuous filament non-woven web without prior application of adhesive to fill up the interstices between the filaments gives a chafer fabric which is impervious to the passage of inflationary air. While it is not intended to be bound by any theory regarding this surprising behavior, the strong bond which is obtained between the web and rubber calendered thereon may be due to mechanical adhesion and the unusual strength properties of the web in all directions, which derives from the use of continuous filament fibers randomly arranged throughout the web. The air imperviousness of the calendered web may be dependent on the absence of fiber ends within the sheet which is inherent because of the use of continuous filament, or on the substantial absence of filament bundles because of the use of a random non-parallel arrangement of filaments.

The invention is further illustrated by the following examples.

EXAMPLE I

A continuous filament (polyethylene terephthalate) non-woven web of 3.6 oz./yd.$^2$ basis weight, containing 16% of cospun ethylene terephthalate/isophthalate (80/20) copolymer filaments as binder, with the base fiber being 16% spontaneous elongatable and having a denier of 1.6, was bonded by heating between embossing screens at 210° C. The bonded web was then calendered on both sides with unvulcanized rubber stock. The rubber stock was first warmed between the top two rolls of a vertical three-roll calender, one roll rotating at 5 r.p.m. and heated at 99° C. and the second roll rotating at 7 r.p.m. and heated at 93° C. When the rubber became tacky a sheet of the non-woven fabric was passed between the center roll and bottom roll (maintained at a temperature of 38° C.) which rotated at 7 r.p.m., thereby coating one side of the fabric. A second pass through coated the second side of the fabric. Each surface of the fabric was thus calendered with 10–15 mils of rubber stock.

For comparative purposes, other samples of the non-woven web were treated with typical adhesives prior to calendering on the rubber stock. Adhesive A was a bis-caprolactam capped 2,4-toluene diisocyanate. Adhesive B was a mixture of a butadiene/styrene/vinyl pyridine terpolymers and resorcinol formaldehyde resin.

EXAMPLE II

The rubberized fabrics from Example I were evaluated for air wick resistance by the following test procedure. The sample for the test is prepared with a mold having top and bottom parts which are mirror images Each part has a shallow slot 0.125" deep, 1" wide and 3" long. Centrally located within this shallow slot is a deep slot 0.250" deep, 0.25" wide and 3" long. In each part of the mold, two layers of 0.125" x 0.25" x 3" rubber stock are placed in the deep slot and one layer of 0.125" x 1" x 3" stock is placed in the shallow slot. The sample of the fabric to be tested, previously cut to 1" x 3", is then placed to coincide with the 1" x 3" rubber stock in the shallow slot of the bottom part of the mold. The top of the mold is positioned on the bottom and the rubber is then cured at 150° C. and 20 tons pressure for 40 minutes. After curing, the mold is cooled, the sample is removed and is then trimmed to make certain that yarn ends are exposed on both edges.

The equipment for testing air wicking consists of a pressure vessel with a slotted surface designed to receive one of the edges containing the yarn ends of the molded sample and a slotted cover plate through which the other edge of the sample is exposed. The cover plate is firmly fastened to the pressure vessel to prevent air leakage around the sample. The exposed edge having the yarn ends is wet with a 10% solution of "Duponol" D paste. Pressure is applied to the other edge having yarn ends and slowly increased. The pressure and number of yarn ends are recorded when the first bubble appears. The pressure is increased to 100 p.s.i. and samples which show no leakage (appearance of bubbles) after 2 minutes at 100 p.s.i. are considered wickproof and pass this test.

The results of this test with a number of rubberized continuous filament non-woven webs prepared in Example I and with rubberized rayon chafer fabrics as controls are summarized in Table I.

TABLE I

| Test No. | Sample Description | Percent Adhesive Pickup | | Air Wick Results |
|---|---|---|---|---|
| | | A | B | |
| 1 | Non-woven Chafer | 0 | 0 | Passed test. |
| 2 | do | 0.8 | 0 | Do. |
| 3 | do | 0 | 5.5 | Do. |
| 4 | do | 0 | 7.3 | Do. |
| 5 | do | 0.7 | 6.0 | Do. |
| 6 | Woven Rayon Chafer | 0 | 0 | Failed test. |
| 7 | do | 0 | 7.2 | Do. |
| 8 | do | 0 | 20.0 | Passed test. |

A second sample of continuous filament (polyethylene terephthalate) embossed non-woven fabric having a basis weight of 3.6 oz./yd.$^2$, containing 9% of an ethylene terephthalate/isophthalate (80/20) copolymer as binder, with the base fiber having a denier of 5.4 and a spontaneous elongatability of 21%, was calendered on both sides with rubber as before, both with and without the use of adhesive. These materials passed the air wick test.

EXAMPLE III

Samples of rubberized non-woven chafer fabrics from Example I were placed between strips of unvulcanized rubber stock to give structures having the following arrangement: rubber—chafer fabric—rubber—chafer fabric—rubber. The middle rubber strip was separated at one end from one chafer fabric by means of an impregnated release fabric, and was similarly separated at the other end from the other chafer fabric. This was done to provide unbonded portions which could be readily clamped in the jaws of a tensile tester for determination of the strength of the rubber to chafer fabric bond. The composite structure was then heated under pressure to effect bonding and vulcanization. The force required to separate the middle rubber layer from each of the chafer fabrics was determined with an Instron Tensile Tester. The results are summarized in Table II.

TABLE II

| Sample | Temperature of Test, °C. | Two-Ply Adhesive Strength | |
|---|---|---|---|
| | | With Adhesive | No Adhesive |
| Non-woven Chafer | 24 | 31.5 | 33.5 |
| Do | 130 | 20.7 | 24.4 |
| Do | $^1$ 130 | 18.1 | 23.0 |
| Woven Rayon Chafer | $^1$ 130 | 22.1 | 8.8 |

$^1$ These samples were tested after 4,000 cycles at 80 lbs. tension over a 0.75" pulley in the Scott Flex Test.

From the results in Tables I and II, it is readily apparent that the rubberized non-woven chafer fabrics of this invention exhibit good air wick resistance and adhesive strength with or without the application of an adhesive to the non-woven web before calendering the rubber stock thereon. It is a surprising advantage of the non-woven chafer fabrics of this invention that the extra cost and operation involved in applying an adhesive is not required, indeed better results are obtained without the adhesive.

EXAMPLE IV

Pneumatic tires (8.50 x 14) were prepared using the rubberized non-woven chafer fabric prepared in Example I without the prior application of an adhesive. The abrasion resistance of these tires was evaluated by a bead flex test. In this test the tires were placed on 6" wide rims, inflated to 30 p.s.i. at 38° C. and loaded to 1807 lbs. (which represents 150% of the maximum Tire and Rim Association rated load at the normal operating pressure of 22 p.s.i.). The tires were mounted at a 2.5° angle with the line perpendicular to the surface of the test wheel. The tires were run at 45 miles/hour. Ordinarily this test is run to tire failure or to a maximum of 3,000 miles. With the tires prepared with the rubberized non-woven tire chafer of this invention, the test was continued to 6,000 miles with no tire failure.

EXAMPLE V

Pneumatic tires (8.50 x 14) as in Example IV were fleet tested under the following conditions:

(a) Inflation pressure: 18 p.s.i. (vs. normal 22 p.s.i.)
(b) Load: 1325 lbs. (10% overload)
(c) Driving Speed: 40 miles/hour
(d) Route: Davis Mountain, Pecos, Texas The tire chafers exhibited satisfactory abrasion resistance after 10,615 miles of fleet testing. The tires were then retreaded, run an additional 8,400 miles and still showed no failure due to lack of abrasion resistance of the chafer.

The rubberized non-woven chafer fabrics of this invention can be readily prepared by calendering rubber directly on the continuous filament non-woven web without requiring the prior application of an adhesive, thereby eliminating a costly and time-consuming processing step. The resulting chafer fabrics exhibit excellent air wick resistance, good conformability, good fabric to rubber adhesion at room temperature and elevated temperatures and after flexing, good abrasion resistance, tear resistance, tensile strength and low moisture regain. These properties of conformability, adhesion, abrasion resistance, tear resistance, tensile strength and low moisture regain also make the rubberized non-woven fabrics of this invention useful in a variety of other applications including V-belt wrapper, conveyor belts and other belting materials, wrappers for hoses, diaphragms for pumps, gaskets, cable wrapping, collapsible fabric tanks, and protective coverings such as laboratory clothing and convertible tops.

What is claimed is:

1. A rubberized non-woven web comprising a continuous polyethylene terephthalate filament non-woven web structure having the filaments in random, non-parallel arrangement and separate and independent of each other except at filament cross-over points, the filaments being bonded at said cross-over points by a heat-fused ethylene terephthalate/isophthalate copolymer and said web having a layer of rubber calendered directly to both sides thereof.

2. A pneumatic tire having reinforced bead portions, the said bead portions having a chafer fabric extending around the bead outwardly of the reinforcing plies, said chafer fabric comprising a continuous polyethylene terephthalate filament non-woven web structure having the filaments in random non-parallel arrangement and separate and independent of each other except at filament cross-over points, the filaments being bonded at said cross-over points by a heat-fused ethylene terephthalate/isophthalate copolymer and said web having a layer of rubber calendered directly to both sides thereof.

References Cited by the Examiner
UNITED STATES PATENTS

| | | | |
|---|---|---|---|
| 2,952,879 | 9/1960 | Kitson et al. | 156—110 |
| 2,985,217 | 5/1961 | Kuhlman | 152—362 |
| 3,013,599 | 12/1961 | Riggs | 156—110 |
| 3,038,518 | 6/1962 | Hershey | 152—362 |

OTHER REFERENCES

Du Pont Technical Information Bulletin, "Multifiber X-64," dated January 1957.

EARL M. BERGERT, *Primary Examiner.*

C. B. COSBY, *Assistant Examiner.*